United States Patent [19]

Hackney

[11] 4,266,955
[45] May 12, 1981

[54] PARTICLE-IN-GAS FILTRATION
[75] Inventor: Stanley Hackney, Warrington, England
[73] Assignee: United Kingdom Atomic Energy Authority, London, England
[21] Appl. No.: 906,201
[22] Filed: May 15, 1978
[30] Foreign Application Priority Data
May 31, 1977 [GB] United Kingdom ............... 23034/77
Feb. 23, 1978 [GB] United Kingdom ................. 7332/78
[51] Int. Cl.$^2$ ........................................... B01D 35/12
[52] U.S. Cl. ........................................ 55/412; 55/350;
55/480; 55/502; 55/503; 55/505; 55/DIG. 9
[58] Field of Search ................. 55/350, 312, 314, 356,
55/385 R, 385 A, 411, 412, 417, 478, 480, 481,
493, 502, 503, 505, DIG. 9

[56] References Cited
U.S. PATENT DOCUMENTS

| 1,943,617 | 1/1934 | Miller ..................................... 55/350 |
| 2,804,165 | 8/1957 | Blomgren et al. ................. 55/385 R |
| 2,996,189 | 8/1961 | Salterbach ............................. 55/481 |
| 3,354,616 | 11/1967 | Lucas .................................. 55/385 R |
| 3,422,601 | 1/1969 | Kolb .......................................... 55/502 |
| 3,690,045 | 9/1972 | Neumann ............................... 55/356 |

FOREIGN PATENT DOCUMENTS

| 861301 | 1/1971 | Canada ....................................... 55/481 |
| 495279 | 12/1927 | Fed. Rep. of Germany ............ 55/417 |
| 295269 | 8/1928 | United Kingdom ...................... 55/417 |
| 933794 | 8/1963 | United Kingdom ...................... 55/478 |

Primary Examiner—David L. Lacey
Attorney, Agent, or Firm—Larson, Taylor and Hinds

[57] ABSTRACT

A filter assembly for particle-in-gas filtration comprises ducts leading to a filter housing which is removable from the ducts and is provided with covers to prevent egress of material from the housing during transport. Covers may be also provided for the ducts. The surfaces of the duct cover and housing cover which are exposed to the environment when the housing is removed may be shielded while gas is passed through the assembly to minimize the exposure of the surfaces to the gas passing through the assembly.

8 Claims, 6 Drawing Figures

PARTICLE-IN-GAS FILTRATION

BACKGROUND OF THE INVENTION

This invention relates to particle-in-gas filtration.

In many industrial processes it is necessary to remove particulate material from the atmosphere within the plant where the process is taking place either to provide better working conditions for the workers or to prevent the contamination of the environment outside the plant. In the nuclear industry, for example, it is necessary to remove any radioactive particles from the atmosphere. It is also necessary when changing filters which have been used to filter radioactive material that the material which has collected on the filter is not redispersed into the atmosphere when the filter is moved and that any surfaces which may have been in contact with, and possibly contaminated by, radioactive materials are not exposed to the environment.

SUMMARY OF THE INVENTION

According to the present invention a filter assembly for particle-in-gas filtration comprises ducts leading to a housing around a filter, which housing is adapted to form part of the ducting through which the gas is arranged to pass, and housing sealing members for sealingly closing the housing before the housing is removed from the rest of the ducting to prevent egress of the contents of the housing when the housing is removed from the rest of the ducting, the surfaces of the housing sealing members which are exposed to the surroundings when the sealed housing is removed from the rest of the ducting being shielded while the filter assembly is in an operative state to minimize the exposure of said surfaces of the housing sealing members to the gas passing through the filter assembly.

Conveniently duct sealing members are provided for the ducts to seal the rest of the ducting to prevent egress of material from the rest of the ducting when the housing is removed from the ducting, said duct sealing members being engageable with the housing sealing members so that the surfaces of the housing sealing members which are exposed to the surroundings when the housing is removed with the housing sealing members in place and the surfaces of the duct sealing members which are exposed to the surroundings when the duct sealing members are in place in the ducting lie within the sealing members, when engaged, to minimize the exposure of said surfaces to the gas passing through the housing.

The housing and duct sealing members may be engaged by means of co-operating bayonet or screw-threaded fittings and means may be provided to withdraw the sealing members when engaged into the ducting.

DESCRIPTION OF THE DRAWINGS

The invention will be illustrated by the following description of several embodiments of the filter assembly given by way of example only, the description has reference to the accompanying drawings in which.

DESCRIPTION OF THE PREFERRED EMBODIMENTS

Figure 1:
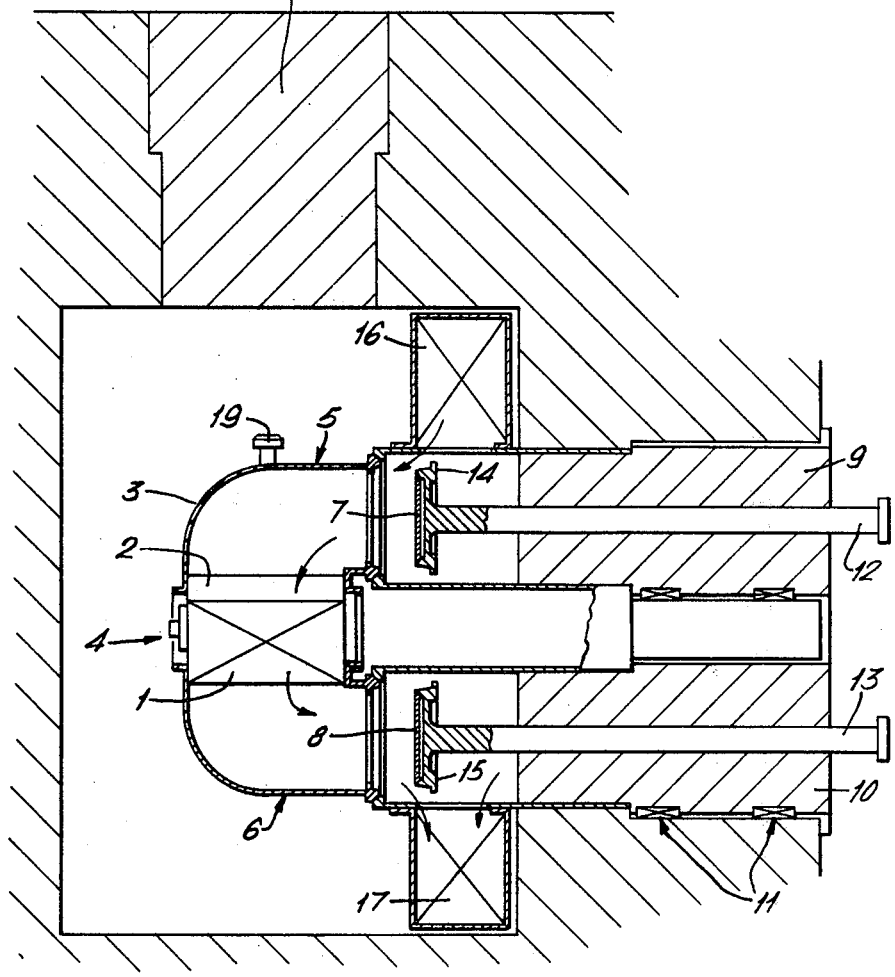
FIG. 1 is a diagrammatic cross-sectional representation of first embodiment of the filter assembly

Referring now to FIG. 1 a filter 1 for removing particles from a gas and having a spark arrester 2 is housed in a housing 3 which is generally U-shaped and comprises a filter holding portion 4 and hollow limbs or conduits 5, 6. The housing 3 forms a part of the ducting by means of which the gas to be filtered is passed to and away from the filter 1. The outer ends of the hollow limbs 5, 6 have internal bayonet fittings which receive housing plugs 7, 8 which when in place seal the housing 3. The ends of the hollow limbs 5, 6 also have external bayonet fittings which are engagable with co-operating bayonet fittings on rotatable duct assemblies 9, 10. To fit the housing 3 to the duct assemblies 9, 10 the housing is lifted so that the external bayonets on the hollow limbs 5, 6 are aligned with those on the duct assemblies 9, 10. Rotation of the duct assemblies interlocks the bayonet fittings linking the hollow limbs 5, 6 to the duct assemblies 9, 10.

The duct assemblies 9, 10 extend through the shielding of the cell containing the housing 3 and are provided with bearings 11 within the shielding on which the duct assemblies 9, 10 rotate. The duct assembly 9 is penetrated by a rotatable rod 12 and the duct assembly 10 is penetrated by a rotatable rod 13. Each rod 12, 13 has at its end within the cell a respective cover plug 14, 15 which is releasably engagable by means of bayonet couplings with the opening in the corresponding duct assembly 9, 10 to seal the opening. Each cover plug 14, 15 is also provided with an internal bayonet fitting on its face remote from the rod 12, 13 which is engagable with a cooperating internal bayonet fitting on one face of the housing plug 7, 8. In use the housing 3 is fitted to the duct assemblies as described above with the housing plugs 7, 8 fitted in the outer ends of the hollow limbs 5, 6 and the cover plugs 14, 15 in place in the openings of the duct assemblies 9,10. The bayonet fitting on the cover plug 14, 15 may then be engaged with the co-operating bayonet fittings on the housing plug 7, 8 by rotating the rod 12, 13. Further rotation of the rod 12, 13 causes the housing plug 7, 8 to be released from the internal bayonet fitting on the inside of the outer end of the hollow limb 5, 6. Rotation of the rod also releases the bayonet couplings which locates the cover plug 14, 15 in the opening in the duct assembly 9, 10. Withdrawal of the rod 12, 13 then causes the inter-engaged housing plugs 7, 8 and cover plugs 14, 15 to be moved to a position in which the opening at the end of the duct assembly 9, 10 communicating with the hollow limb or duct 5, 6 is not occluded. When the housing plug 7, 8 and cover plug 14, 15 are inter-engaged the surfaces of the plugs which are exposed when the housing 3 and duct assemblies 9, 10 are separated with their respective plugs in place, are held together and therefore their exposure to the atmosphere passing through the filter is minimized. By passing air down a bore in the rods 12, 13 a flow of air from the space between inter-engaged plugs into the chamber may be maintained to prevent ingress of the atmosphere passing through the filter into said space. By the use of suitable seals the exposure of the surfaces to the atmosphere passing through the filter can be prevented so that when the plugs are replaced in the limbs and openings in the duct assemblies these surfaces are not contaminated and the risk of spreading contamination to the surroundings is much reduced.

In use, air containing particulate matter to be filtered passes through an inlet duct 16, through the opening in the duct assembly 9 into the housing 3 and through the spark arrester 2 and filter 1 before passing through the opening in the duct assembly 10 into an outlet duct 17. When it is required to change the filter the rods 12, 13 are advanced into the cell and rotated so that the housing plugs 7, 8 engage with the outer end of the hollow limbs 5, 6 to seal the casing 3, so that the cover plugs 14, 15 occlude the openings in the duct assemblies 9, 10 and so that the housing plugs 7, 8 become disengaged from the cover plugs 14, 15. Rotation of the duct assemblies 9, 10 releases the housing 3 which can then be removed through an access port 18 by using a lifting pintle 19. The particulate material held on the filter 1 is sealed within the housing 3 by the housing plugs 7, 8 and because the exposure of the surfaces of the housing plugs 7, 8 which are exposed when the housing 3 is removed from the duct assemblies 9, 10 is minimized the risk of contamination spreading when the housing 3 is being transported is reduced. A replacement housing 3 may then be fitted.

Figure 2:
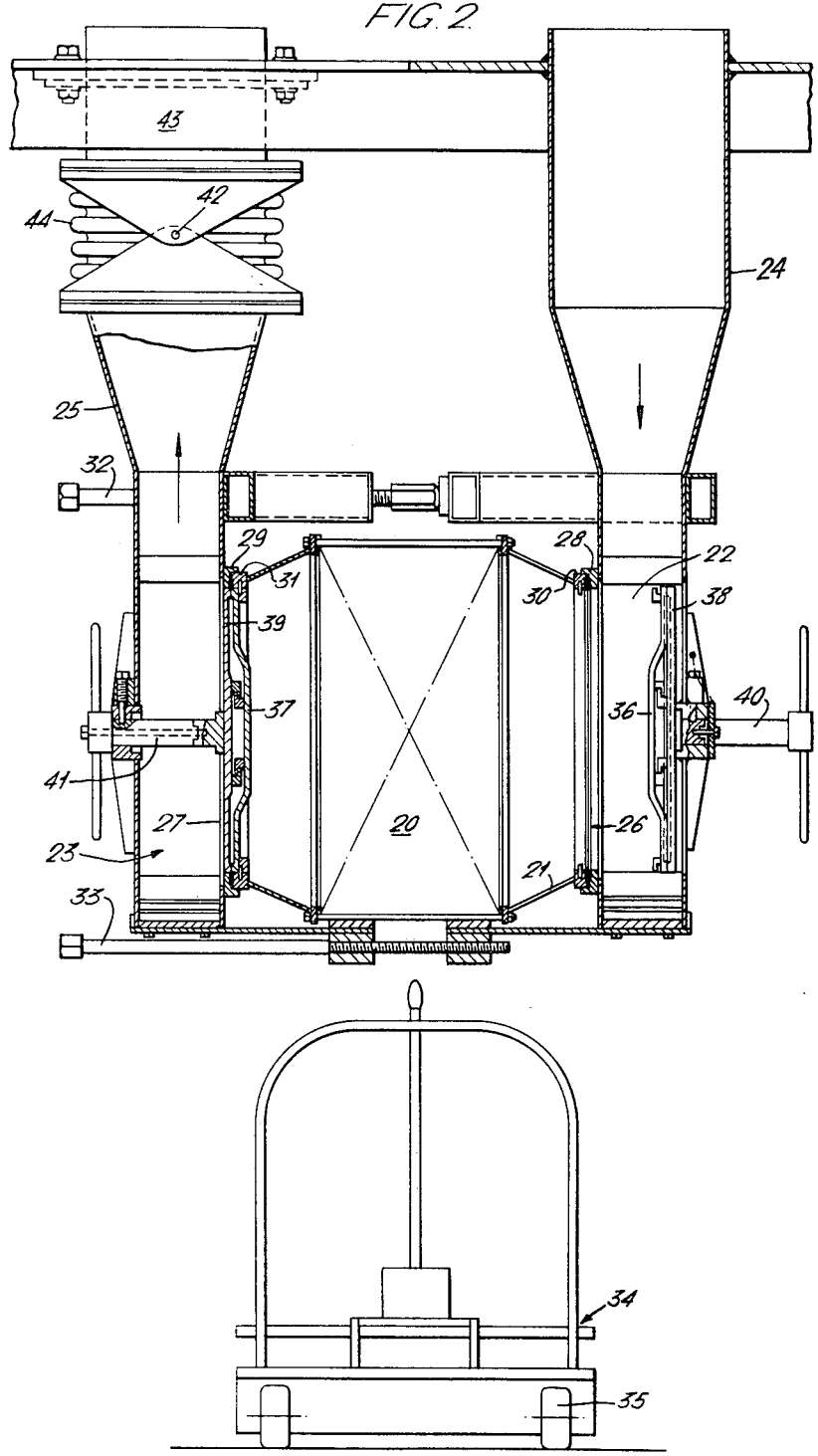
FIG. 2 is a diagrammatic cross-sectional representation of a second embodiment of the filter assembly.

Referring now to FIG. 2 a filter 20 is housed in a housing 21 mounted between chamber 22, 23 connected to a fixed inlet duct 24 and a pivotally mounted outlet duct 25 respectively. When in the operative position the housing 21 forms part of the ducting through which the gas passes. The chambers 22, 23 communicate with the interior of the housing 21 via openings 26, 27. Around each of the openings 26, 27 is a flange 28, 29 which engages a flange 30, 31 around the end of the housing 21 when the housing 21 is in its operative position. The flanges 28, 29 on the chambers and the flanges 30, 31 on the housing 21 are held in contact by clamping screws 32, 33 which are tightened to hold the housing 21 in position and loosened to permit the housing 21 to be withdrawn. A lift 34 mounted on wheels 35 is provided to raise and lower the housing 21 and to move it into position. The duct 25 is pivoted around hinge pins 42 and is connected to ducting 43 by a flexible bellows 44.

When the housing 21 is being transported it is sealed by housing plugs 36, 37 which are releasably engaged with bayonet couplings on the housing flanges 30, 31. The exterior face of each housing plug 36, 37 has bayonet fitting which can be engaged by a co-operating bayonet fitting on a chamber plug 38, 39, so that the exterior faces of the plugs are held together and exposure of the exterior faces of the plugs to the gas passing through the filter is minimized. The chamber plugs 38, 39 are also provided with external bayonet fittings which are engagable with bayonet fittings on the inside of the chamber flanges 28, 29 to seal the openings to the chambers 22, 23. Each chamber plug 38, 39 is connected to one end of a shaft 40, 41 which penetrates a wall of the chamber 22, 23. The shaft, 40, 41 is able to rotate and is able to be advanced into the chamber and be retracted from the chamber.

The procedure for fitting a filter housing 21 will now be described. The housing to be fitted will have its plugs 36, 37 in place and the chamber plugs 38, 39 will be in position to close the openings 26, 27 in the chambers 22, 23. The housing 21 is then lifted by the screwlift 34 so that it is placed between the chambers 22, 23 with the housing flanges aligned with the chamber flanges. The clamping screws 32, 33 are then tightened so that the pivotally mounted outlet duct 25 is pivotted towards the fixed inlet duct 24 gripping the filter housing between them. Rotation of the shafts 40, 41 then interlocks the housing plugs 36, 37 with the chamber plugs 38, 39 (this position is shown in the left hand chamber 23 of FIG. 2) and releases the plugs from the openings and housing. The combined plugs may then be retracted to a position (as shown in the right hand chamber 22 of FIG. 2) to permit gas from the duct 24 to pass into the housing 21. With the combined plugs on the outlet side of the housing 21 also in a retracted position the gas leaving the housing passes through the chamber 23 and into the duct 25.

To remove a filter in its housing 21 the shafts 40, 41 are fully advanced into the chamber and rotated so that each of the housing and chamber plugs becomes engaged in the respective end of the housing or chamber opening to seal the housing and chamber openings and so that the housing and chamber plugs disengage. Slackening the clamping screws 32, 33 allows the housing to be lowered from between the chambers by the screw lift 34. The ends of the filter housing 21 are closed by the housing plugs 36, 37 preventing any of the particulate material on the filter being released to the surroundings.

Figure 3:
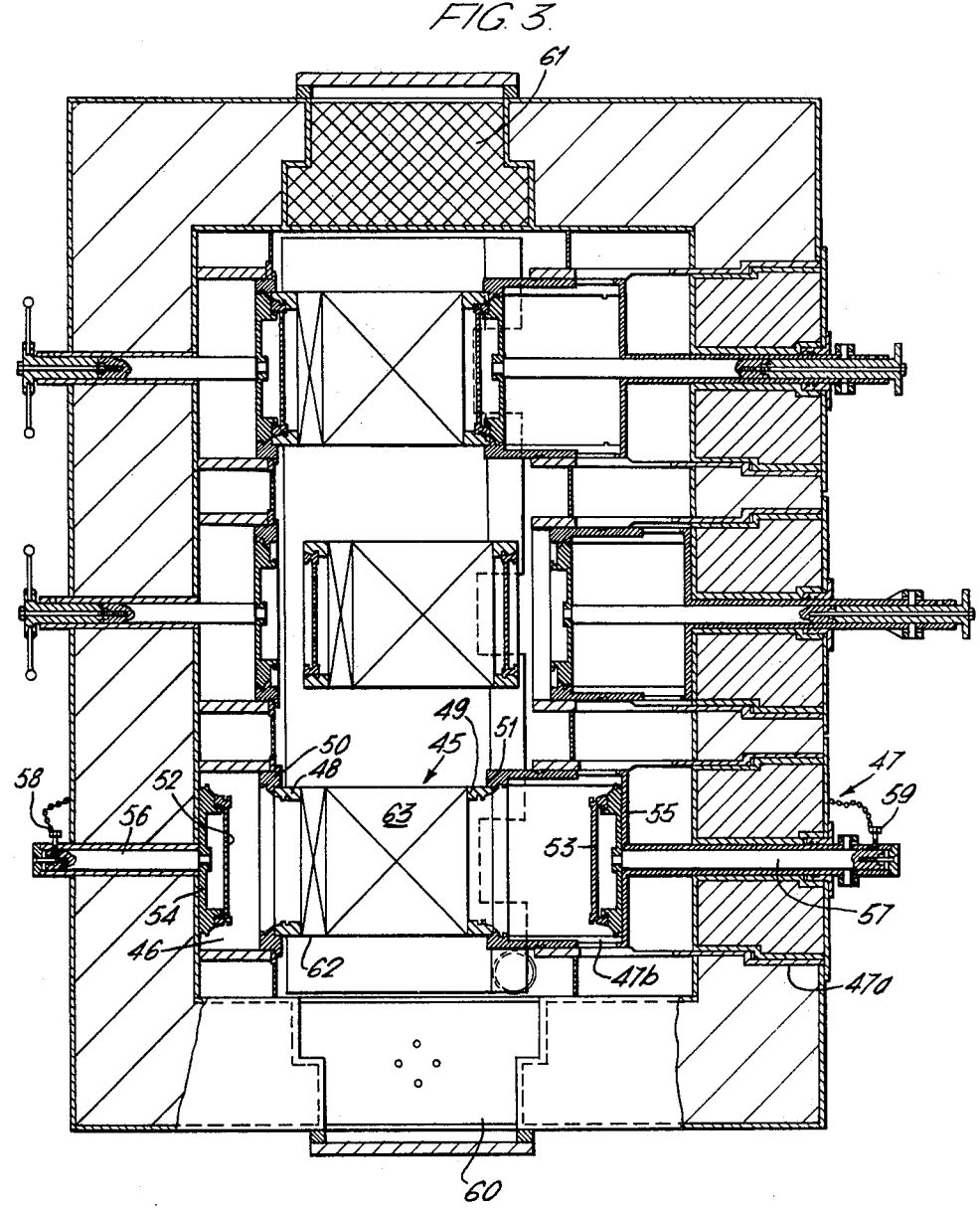
FIG. 3 is a diagrammatic cross-sectional representation of a third embodiment.

Referring now to FIG. 3 a filter assembly contains filter housings 45 which can be located between a stationary duct 46 and a telescopically movable duct 47. The telescopically movable duct 47 comprises a fixed outer portion 47a and a movable portion 47b which is a sliding fit within the outer portion 47a. When in the operating position (as shown in the lowermost part of FIG. 3) flanges 48, 49 around the ends of the filter housing 45 are held in abutment with flanges 50, 51 on the stationary and movable ducts 46, 47 respectively. The stationary duct 46 forms the inlet for the gas to be filtered and the movable duct 47 forms the outlet for the filtered gas. The flanges 48, 49 of housing 45 having bayonet couplings to receive plugs 52, 53. The ducts 46, 47 also have bayonet couplings to receive duct sealing plugs 54, 55. The duct sealing plugs 54, 55 are supported on the end of shafts 56, 57 passing through the shielding of the filter cell and can be advanced and retracted and rotated to engage with and remove the end plugs 52, 53 in a similar manner to that described hereinbefore with reference to FIG. 1.

The operation of the filter assembly illustrated in FIG. 3 will now be briefly described. A filter housing 45 having its end plugs 52, 53 in place is located between the stationary duct 46 and the movable duct, 47 (this is illustrated at the center of FIG. 3). The inner portion 47b of the telescopically movable duct 47 is then advanced so that the housing 45 is held between the stationary and movable ducts 46, 47 (this is illustrated by the uppermost part of FIG. 3). Rotation of the shafts 56, 57 then interengages the end plugs 52, 53 and sealing plugs 54, 55 and releases the inter-engaged plugs from the flanges, 50 and 49. The shafts are then retracted so that the inter-engaged plugs are moved into the ducts 46, 47 allowing gas to flow from the inlet duct through the housing to the outlet duct (this is illustrated in the lowermost part of FIG. 3). The shafts 56, 57 are locked in their retracted positions by pins 58, 59.

When a filter needs to be changed the end plugs 52, 53 and duct sealing plugs 54, 55 are fitted to the housing and duct by reversing the operations described above and the inner portion 47b of the movable duct 47 retracted so that the housing 45 can be removed. The particulate matter on the filter is sealed within the housing and therefore is prevented from contaminating the surroundings as the sealed housing is moved. The surface of the end plugs 52, 53 which are exposed to the surroundings when the sealed housing is being moved are shielded from contamination while the filter assembly is in use by being inter-engaged with the duct sealing plugs and therefore the amount of contamination passing to the surroundings is minimized.

The assembly shown in FIG. 3 also has access ports 60, 61 through which filter housings are introduced into or removed from the cell. The filter housings are passed into the cell and are positioned by lifting rods located over each position. The housing 45 contains a spark arrester 62 and a filter element 63.

In a further assembly (not illustrated) the filter housing is held in its operative position between two telescopically movable ducts similar to those described above with reference to FIG. 3.

Figure 4:
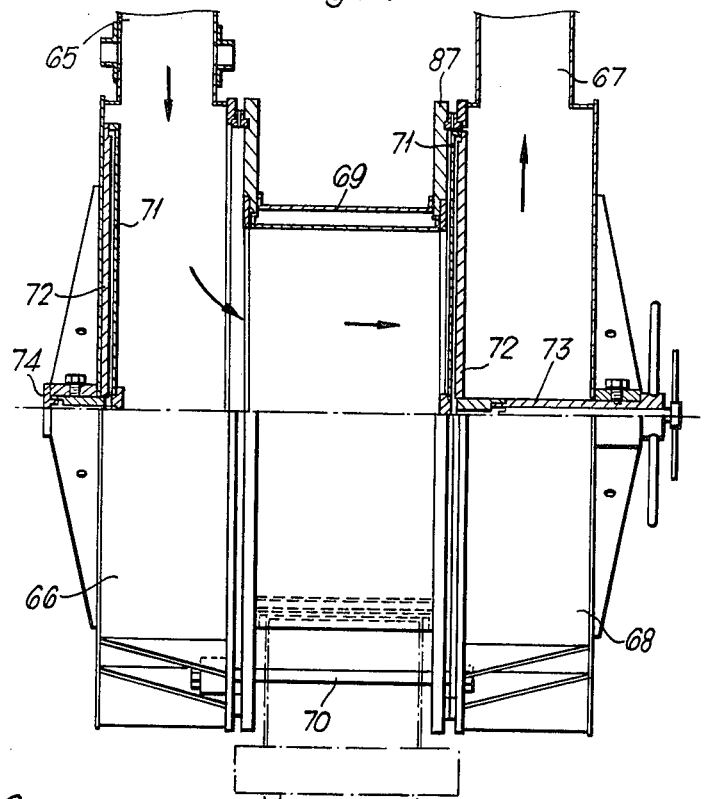
FIG. 4 is a view partially in section of a further filter assembly
Figure 6:
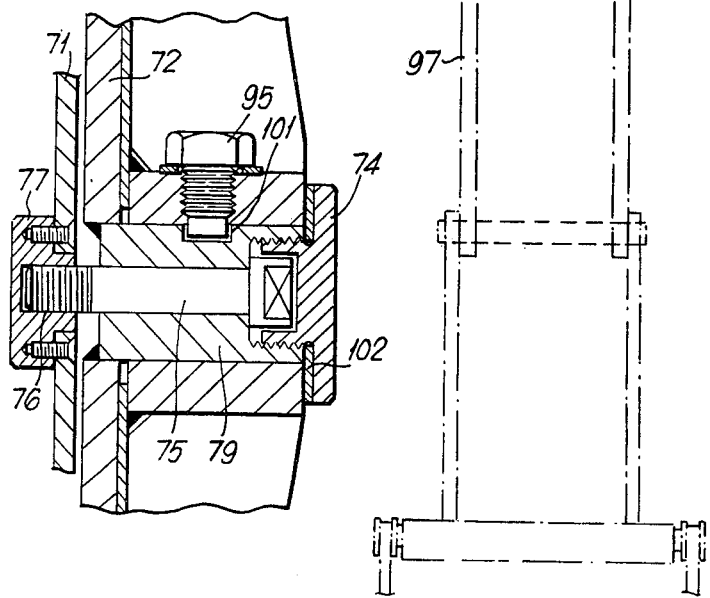
FIG. 6 is a sectional view of the same scale as FIG. 5 of a part of the filter assembly in a position to permit air to pass through the filter.

Referring to FIG. 4 there is illustrated a filter assembly comprising an inlet duct 65 leading to a inlet chamber 66 and an outlet duct 67 leading from an outlet chamber 68. A filter housing 69 is located between the inlet and outlet chambers and is held in place between the chambers by bolts such as that identified by the reference numeral 70. A housing cover 71 and a chamber cover 72 are provided which may be used to occlude both ends of the filter housing and the openings to the chambers 66, 68. In the right hand section of FIG. 4, the housing cover and the chamber cover are shown in a position where the filter housing and the entrance to the chamber 68 are blocked whereas in the left hand section of FIG. 4 the housing cover 71 and chamber cover 72 are shown in a position in which air is free to flow from the duct 65, through the chamber 66 and into the filter housing 69. These positions will hereinafter be referred to as the advanced and retracted positions. The covers 71, 72 are held together when the filter housing is in position between the chambers but can be separated to seal the filter housing and chamber openings respectively when it is required to remove the filter housing. The combined covers are moved between the advanced and retracted positions by a shaft 73 as will be described in more detail hereinafter with reference to FIG. 5. When the combined covers are located in the retracted position the shaft 73 may be removed and a cap 74 may be fitted as will be described with reference to FIG. 6.

Figure 5:
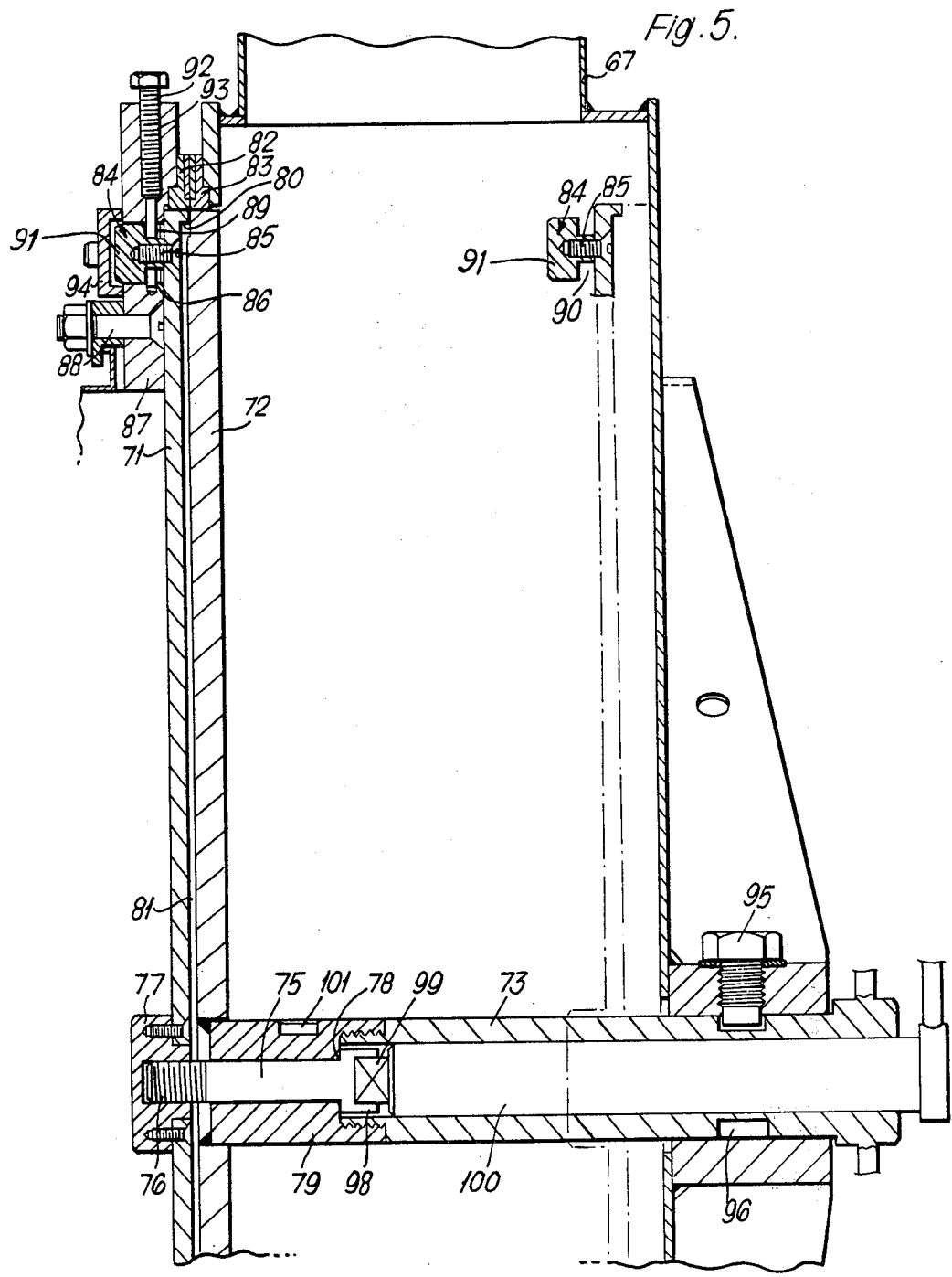
FIG. 5 is an enlarged section view of a part of the filter assembly of FIG. 4.

Referring now to FIG. 5 the housing and chamber covers 71, 72 are shown in the advanced position (solid lines) and the retracted position (chain dotted lines). The housing cover 71 and the chamber cover 72 are held together in the combined position by a bolt 75 which screws into a screw-threaded blind bore 76 in a boss 77 attached to the center of the housing cover 71. As the bolt screws into the bore 76 the head of the bolt contacts a shoulder 78 inside a projection 79 extending from the center of the chamber cover 72 and causes the covers 71, 72 to be held together so that a peripheral flange 80 around the housing cover 71 is forced into sealing contact with the chamber cover 72 to prevent ingress of material into a space 81 between the covers 71, 72. The surfaces which bound the space 81 are those surfaces which are exposed to the atmosphere when the covers 71, 72 are separated and in position to seal the filter housing and chamber openings. It is therefore important that these surfaces do not become contaminated when the filter assembly is in use otherwise the risk of spreading the contamination is increased. When the combined covers are in the advanced position their peripheries contact flexible sealing rings 82, 83. The ring 82 is attached to the filter housing 69 and the ring 83 to the wall of the chamber 68.

When the filter housing 69 is separated from the chambers 66, 68 the ends of the housing are sealed by the housing cover 71 and the sealing ring 82. The housing cover 71 is secured to the filter housing 69 by projections 84 which are attached to the cover 71 by screws 85 and which are received in apertures 86 in an annular flange 87 secured around the end of the filter housing 69 by bolts 88. A locking pin 89 is inserted into groove 90 formed between an enlarged portion 91 of each projection 84 and the cover 71. The locking pin 89 extends from a bolt 92 which is received in a radial screw-threaded bore 93 in the flange 87. A dished cover plate 94 is positioned over the aperture 86. When the filter housing 69 is removed the chamber opening is sealed by the chamber cover 72 and the sealing ring 83. The cover 72 is held in the advanced position by a screw-threaded locking pin 95 which enters a circumferential groove 96 in the shaft 73 to prevent the shaft being moved from the advanced position.

Next to be discussed is the procedure to be adopted when a filter housing 69 with its housing covers 71 fitted is to be placed in position between the chambers 66, 68 the latter having their respective chamber covers 72 in position to seal the corresponding chamber openings. The filter housing 69 is lifted into a position between the chambers 66, 68 by a scissor lift 97. The bolts 70 are then tightened to pull the chambers together to locate the filter housing between them with the sealing rings 82, 83 in contact. The bolt 75 is then screwed into the boss 77 to hold the covers 71, 72 together. The bolt 75 has a socket 98 of square cross section in its head which received a key 99 on a shaft 100 which is located within a bore in the shaft 73 and is rotatable within the bore and is removable therefrom. The locking pins 89 and the locking pin 95 are then removed and the combined covers are moved to the retracted position shown in full lines in the chain dotted lines in FIG. 5 and also shown in FIG. 6. A bore 101 in the projection 79 receives the locking pin 95 in the retracted position. The shaft 100 can then be removed and the shaft 73 unscrewed and separated from the projection 79. A cap 74 may then be screwed on to the projection 79 to seat on a gasket 102. A similar procedure is adopted to remove the covers from the outer end of the filter housing and to move them to the retracted position so that the air to be filtered can pass through the filter assembly. When the filter has to be changed the above procedure is reversed and the filter housing removed with the covers 71 in place leaving the chamber openings sealed by the chamber covers 72. The particulate matter on the filter cannot become dispersed as the ends of the filter housing is sealed by the covers 71.

The filter assembly preferably operates at less than atmospheric pressure so that any leakage causes an in-flow of air into the filter assembly. Conveniently a supply of air may be led into the space 81 between the covers 71, 72 so that, should the covers 71, 72 not be in a complete sealing relationship, air will flow from the space 81 into the assembly preventing the deposition of contamination in the space 81 and at the point at which the leakage occurs.

It is preferable to reuse the filter housing to contain further filtering medium. When used to filter air containing radioactive particles any handling of the filter housing and its contents has to be performed remotely. One method of replacing the contents of the filter housing 69 when it contains radioactive material will be described briefly. The filter housing is placed between two glove boxes fitted with openings and covers similar to those described above for the chambers 66, 68. After the covers have been retracted the contents of the filter housing are pushed from the housing into one of the glove boxes where the used filtering medium may be broken down before being removed to a storage or disposal facility. New filtering medium is inserted into the filter housing from the other of the glove boxes. Thus the new medium does not contact any surfaces which have been contacted by the contaminated used medium.

The filter assemblies described herein find particular application in nuclear installations where it is necessary to remove radioactive particles from the atmosphere within the installations and where it is necessary to prevent the particulate material on a used filter passing into the surroundings.

I claim:

1. A filter assembly for particle in gas filtration comprising an inlet duct having an inlet opening and an outlet opening, an outlet duct having an inlet opening and an outlet opening, a housing for filter means having an inlet housing opening and an outlet housing opening, said housing being removably placed between the outlet opening of the inlet duct and the inlet opening of the outlet duct with the inlet housing opening aligned with and connected to the outlet opening of the inlet duct and the outlet housing opening aligned with and connected to the inlet opening of the outlet duct so that gas passing through the filter assembly passes from the inlet duct to the outlet duct through the housing, filter means located within the housing for filtering particles from the gas passing through the housing, a first housing sealing member releasably received in the inlet housing opening for sealingly closing the inlet housing opening to prevent egress of the contents of the housing, a second housing sealing member releasably received in the outlet housing opening for sealingly closing the outlet housing opening to prevent egress of the contents of the housing, a first duct sealing member releasably received in the outlet opening of the inlet duct for sealingly closing the outlet opening, a second duct sealing member releasably received in the inlet opening of the outlet duct for sealingly closing the inlet opening, means on said first housing sealing member for engaging said first duct sealing member, means on said second housing sealing member for engaging said second duct sealing member, means for locating said first housing sealing member in the inlet housing opening and said first duct sealing member in the outlet opening of the inlet duct while the inlet housing opening is aligned with and connected to the outlet opening of the inlet duct, means for locating said second housing sealing member in the outlet housing opening and said second duct sealing member in the inlet opening of the outlet duct while the outlet housing opening is aligned with and connected to the inlet opening of the outlet duct, said first and second duct sealing members being engageable with said first and second housing sealing members respectively in such a way that the surfaces of the housing sealing members which are exposed to the surroundings when the housing sealing members are in place in the housing openings and the housing has been separated from the ducts and the surfaces of the duct sealing members which are exposed to the surroundings when the duct sealing members are in place in the duct opening and the housing has been separated from the ducts lie within the housing sealing members and duct sealing members, when the housing sealing members and duct sealing members are engaged, to minimize the exposure of said surfaces to the gas passing through the housing.

2. A filter assembly as claimed in claim 1 wherein the means on said first housing sealing member for engaging with said first duct sealing member comprises bayonet fittings on the first housing sealing member for engaging corresponding bayonet fittings on the first duct sealing member and the means on said second housing sealing member for engaging with said second duct sealing member comprises cooperating bayonet fittings on the second housing sealing member for engaging corresponding bayonet fittings on the second duct sealing member.

3. A filter assembly as claimed in claim 2 wherein each of the inlet housing opening and outlet housing opening is provided with a first internal bayonet fitting which co-operates with the respective housing sealing member to seal the housing when the housing is being moved, wherein each of the outlet opening of the inlet duct and the inlet opening of the inlet duct is provided with a second internal bayonet fitting which cooperates with an external bayonet fitting on the respective duct sealing member to seal the duct when the housing has been removed, and wherein the means for locating the first housing sealing member in the inlet housing opening and the first duct sealing member in the outlet opening of the inlet duct includes a first rotatable rod on which the first duct sealing member is mounted and the means for locating the second housing sealing member in the outlet housing opening and the second duct sealing member in the inlet opening of the outlet duct includes a second rotatable rod on which the second duct sealing member is mounted, said first rotatable rod being movable from a first position in which the first duct sealing member is positioned to seal the outlet opening of the inlet duct and a second position in which the first duct sealing member is withdrawn into the inlet duct, said second rotatable rod being movable from a first position in which the second duct sealing member is positioned to seal the inlet opening of the outlet duct and a second position in which the second duct sealing member is withdrawn into the outlet duct, rotation of the first rotatable rod when the first rod is in the first position, the inlet housing opening is aligned with and connected to the outlet opening of the inlet duct and the first housing sealing member is in place to seal the inlet housing opening, causing engagement of the member first housing sealing member and first duct sealing member and disengagement of the inlet housing opening and the outlet opening of the inlet duct, and rotation of the second rotatable rod when the rod is in the first position, the outlet housing opening is aligned with and connected to the inlet opening of the outlet duct and the second housing sealing member is in place to seal the outlet housing opening, causing engagement of the second housing sealing member and second duct sealing member and disengagement of the outlet housing opening and the inlet opening of the outlet duct.

4. A filter assembly as claimed in claim 3 wherein: the housing is generally U-shaped and the inlet housing opening and outlet housing opening are located at the ends of the limbs of the U, the inlet duct is rotatable, the outlet duct is rotatable, said housing includes an external fitting around the inlet housing opening, said rotatable inlet duct includes an internal fitting around the outlet opening of the rotatable inlet duct so that rotation of the inlet duct causes engagement of the external fitting with the internal fitting to align the inlet housing opening with and to connect the inlet housing opening to the outlet opening of the outlet opening of the inlet duct, said housing includes an external fitting around the outlet housing opening, and said rotatable outlet duct includes an internal fitting around the inlet opening of the rotatable outlet duct so that rotation of the outlet duct causes engagement of the last mentioned external fitting with the last mentioned internal fitting to align the outlet housing opening with and to connect the outlet housing opening to the inlet opening of the outlet duct.

5. A filter assembly as claimed in claim 3 wherein the inlet duct is a fixed duct and the outlet duct is a pivotally mounted duct and the housing is clamped therebetween.

6. A filter assembly as claimed in claim 3 wherein the inlet duct is a stationary duct and the outlet duct is movable telescopically towards the stationary duct to receive the housing therebetween.

7. A filter assembly as claimed in claim 1 wherein: said housing includes first seal means around the inlet housing opening on which the first housing sealing member seats to prevent egress of the contents of the housing, said housing including second seal means around the outlet housing opening on which the second housing sealing member seats to prevent egress of the contents of the housing, said inlet duct including third seal means around the outlet opening of the inlet duct on which the first duct sealing member seats to sealing close said outlet opening, said outlet duct including fourth seal means around the inlet opening of the outlet duct on which the second duct sealing member seats to sealingly close said inlet opening, the means for locating said first housing sealing member in the inlet housing opening and said first duct sealing member in the outlet opening of the inlet duct comprises a first movable rod connected to said first duct sealing member.

the means on said first housing sealing member for engaging with said first duct sealing member comprises a screw-threaded fitting on said first housing sealing member which cooperates with a screw-threaded fitting on said first duct sealing member so that on relative rotation of the fittings the first housing sealing member is brought into contact with said first duct sealing member, said first movable rod being movable from a first position in which the first duct sealing member is seated on the third seal means to sealingly close the outlet opening of the inlet duct and a second position in which the first duct sealing member is withdrawn into the inlet duct, the means for locating said second housing sealing member in the outlet housing opening and said second duct sealing member in the inlet opening of the outlet duct comprises a second movable rod connected to said second duct sealing member, and the means on said second housing sealing member for engaging with said second duct sealing member comprises a screw-threaded fitting on said second duct sealing member which cooperates with a screw-threaded fitting on said second duct sealing member so that on relative rotation of the fittings the second housing sealing member is brought into contact with said second duct sealing member, said second movable rod being movable from a first position in which the second duct sealing member is seated on the fourth seal means to sealingly close the inlet opening of the outlet duct and a second position in which the second duct sealing member is withdrawn into the outlet duct.

8. A filter assembly as claimed in claim 1 wherein the respective housing sealing members and duct sealing members are positioned and arranged such that a space is formed therebetween when engaged, the space being defined by said surfaces of the housing sealing members and duct sealing members, and so as to allowing air to be drawn into the space and from there into the filter assembly when the filter assembly is operating at less than atmospheric pressure.

* * * * *